M. TODD.
Broadcast Seeder
No. 37,184.  Patented Dec. 16, 1862.
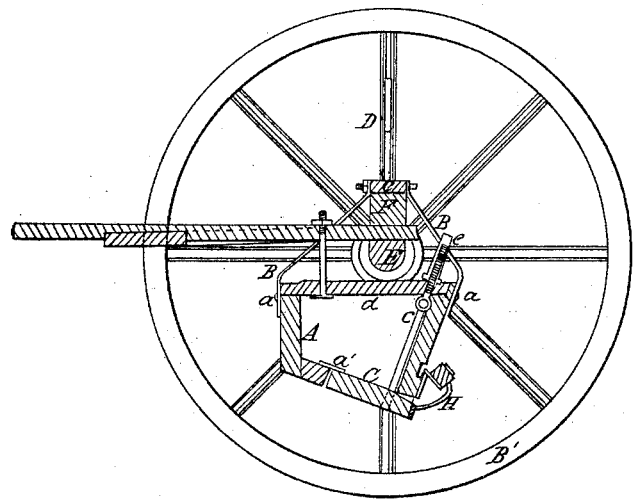
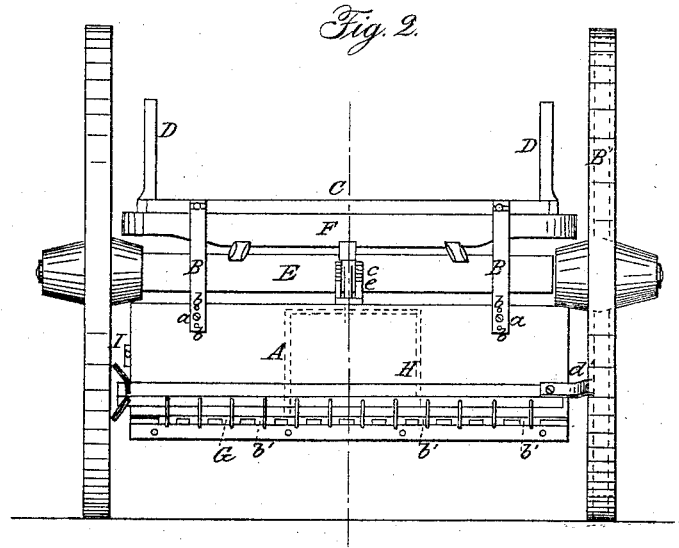
Witnesses:
Inventor:

UNITED STATES PATENT OFFICE.

MORRIS TODD, OF QUASQUETON, IOWA.

IMPROVEMENT IN SEEDING-MACHINES.

Specification forming part of Letters Patent No. 37,184, dated December 16, 1862.

*To all whom it may concern:*

Be it known that I, MORRIS TODD, of Quasqueton, in the county of Buchanan and State of Iowa, have invented a new and Improved Seeding-Machine; and I do hereby declare that the following is a full, clear, and exact description of the same, reference being had to the accompanying drawings, making a part of this specification, in which—

Figure 1 represents a longitudinal vertical section of my invention, the plane of section being indicated by the line $x\ x$, Fig. 2. Fig. 2 is a rear elevation of the same.

Similar letters of reference in both views indicate corresponding parts.

This invention consists in the arrangement of a vertically-adjustable hopper-box suspended by means of suitable straps or pendants from the axle of the hind wheels of an ordinary wagon, and provided with a hinged adjustable bottom, in combination with a gage-screw, in such a manner that said hopper can easily be adjusted to suit wagons of different heights, and the bottom can be set to sow different seeds or different quantities of seed per acre by means of the gage-screw, which is provided with a suitable scale to indicate the quantity of seed sown per acre for different positions of the hopper-bottom.

To enable those skilled in the art to make and use my invention, I will proceed to describe its construction and operation with reference to the drawings.

A represents a hopper-box, made of wood or any other suitable material, in the ordinary shape, and of any convenient size. This hopper is suspended by means of straps or pendants B from the platform C, which slides up and down between standards D, that rise from the axle E, or from the bolster F, that may be rigidly attached to said axle. Said pendants or straps may, however, be attached directly to the axle E, and they are secured to the hopper-box A by means of bolts or screws $a$, and by inserting these screws or bolts in different holes $b$ the hopper can be adjusted higher or lower; or, if the straps B are secured to the platform C, the hopper may be adjusted by raising or lowering said platform, so as to accommodate itself to the height of different wagons.

The bottom G of the hopper is attached to the box A by means of one or more hinges, $a'$, so that the rear or discharging edge of said bottom can be turned up close to the edges of the box or down away from said edges, as may be desirable, and it is provided with notches or grooves $b'$ to permit the seed to discharge.

For the purpose of adjusting the bottom a stirrup or bolt, $c$, is fastened with its lower end or ends to the bottom G, and its upper end passes through a bridge, $d$, in the middle of the hopper-box. This upper end is provided with a screw-thread, fitting into a nut, $e$, with two wings, each or one of which is provided with a scale, the marks of which, in coming opposite the upper edge of the bolt, serve to indicate the quantity of seed to be sown per acre. By turning the nut up the bottom G is lowered, and the grooves $b'$ in the lower edge of the bottom discharge larger seed than before; or, if the same seed is used, more seed will now be sown to the acre than before, and if the nut is turned down the quantity of seed which discharges in a certain time is diminished.

The discharge of the seed from the hopper may be facilitated by a stirrer, H, the teeth of which extend into the opening between the lower edge of the box and the bottom, and to which a reciprocating motion may be imparted by a suitable cam, $d'$, and spring, or in any other desirable manner from the wheel B'. A lever, I, attached to the side of the hopper-box, serves to arrest the motion of the stirrer.

Having thus fully described my invention, what I claim as new, and desire to secure by Letters Patent, is—

The arrangement of the vertically-adjustable hopper-box A, suspended by means of straps or pendants B from the hind axle, E, of an ordinary wagon, in combination with the gaging-screw $c$ and hinged bottom G, all constructed and operating in the manner and for the purpose shown and described.

MORRIS TODD.

Witnesses:
WM. H. JOSLIN,
A. M. WILCOX.